(12) United States Patent
Rahman

(10) Patent No.: US 12,363,575 B2
(45) Date of Patent: Jul. 15, 2025

(54) DYNAMICALLY TOGGLING PHYSICAL DOWNLINK CONTROL CHANNEL (PDCCH) INTERLEAVING

(71) Applicant: T-Mobile USA, Inc., Bellevue, WA (US)

(72) Inventor: Muhammad Tawhidur Rahman, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 356 days.

(21) Appl. No.: 17/818,340

(22) Filed: Aug. 8, 2022

(65) Prior Publication Data

US 2024/0049025 A1 Feb. 8, 2024

(51) Int. Cl.
*H04W 24/10* (2009.01)
*H04L 1/00* (2006.01)

(52) U.S. Cl.
CPC ........... *H04W 24/10* (2013.01); *H04L 1/0071* (2013.01)

(58) Field of Classification Search
None
See application file for complete search history.

(56) References Cited

U.S. PATENT DOCUMENTS

| | | | |
|---|---|---|---|
| 11,589,347 B2 * | 2/2023 | Kuchibhotla | H04W 72/0446 |
| 11,838,151 B1 * | 12/2023 | Jones | H04L 25/0224 |
| 11,979,350 B1 * | 5/2024 | Eyuboglu | H04B 7/0874 |
| 12,088,535 B2 * | 9/2024 | Cheng | H04W 72/23 |
| 2004/0121788 A1 | 6/2004 | Moon et al. | |
| 2010/0050059 A1 | 2/2010 | Cheng | |
| 2016/0323013 A1 * | 11/2016 | Nakao | H04J 11/0053 |
| 2017/0005775 A1 * | 1/2017 | Cheng | H04W 40/005 |
| 2018/0131467 A1 | 5/2018 | Sankar et al. | |
| 2018/0367252 A1 | 12/2018 | Nammi et al. | |
| 2020/0029356 A1 * | 1/2020 | Choi | H04L 5/0053 |
| 2020/0274656 A1 * | 8/2020 | Gordaychik | H04L 1/1671 |
| 2022/0124526 A1 * | 4/2022 | Lee | H04W 36/0072 |

(Continued)

FOREIGN PATENT DOCUMENTS

EP 3200370 A1 8/2017

OTHER PUBLICATIONS

International Search Report and Written Opinion issued in PCT Application No. PCT/US2023/069827 Mailed Date: Dec. 21, 2023, 18 pages.

*Primary Examiner* — Phirin Sam
(74) *Attorney, Agent, or Firm* — Foley IP Law, PLLC

(57) ABSTRACT

Solutions for dynamically toggling physical downlink control channel (PDCCH) interleaving include: a base station receiving radio measurement reports from a user equipment (UE); based on at least the radio measurement reports, determining that radio reception by the UE meets a threshold; based on at least meeting the threshold, ceasing to interleave data on the PDCCH. The base station continues to monitor radio measurement reports from the UE, and based on at least the radio measurement reports indicating that radio reception by the UE meets a second threshold, resuming interleaving data transmitted on the PDCCH. In some examples, UEs are managed in broadcast groups (e.g., UEs within a common in a cell sector), and interleaving or ceasing interleaving is based on a determination of whether all UEs in the broadcast group are able to forego interleaving.

19 Claims, 6 Drawing Sheets

(56) References Cited

U.S. PATENT DOCUMENTS

| | | | |
|---|---|---|---|
| 2022/0158799 A1* | 5/2022 | Chen | H04L 5/0053 |
| 2022/0167229 A1* | 5/2022 | Chou | H04W 24/02 |
| 2023/0269749 A1* | 8/2023 | Palle Venkata | H04W 72/232 |
| | | | 370/329 |
| 2024/0413959 A1* | 12/2024 | Cheng | H04L 5/14 |

* cited by examiner

DYNAMICALLY TOGGLING PHYSICAL DOWNLINK CONTROL CHANNEL (PDCCH) INTERLEAVING

BACKGROUND

The physical downlink control channel (PDCCH) is a key logical radio channel through which a user equipment (UE) learns which radio resource elements in time and frequency domain to use for ascertaining scheduling information for downlink (DL) broadcast and DL/uplink (UL) unicast data transmission. For example, the PDCCH transmits DL control information (DCI). Due to the significance of the information it carries, it is beneficial to ensure that the PDCCH is a sufficiently robust channel that it is easily decoded even in unfavorable radio conditions.

One technique used to ensure the robustness of the PDCCH is interleaving. The use of interleaving is intended to render the PDCCH more tolerant to burst errors that may exceed the correction capacity of the channel's error correction. The idea is that, upon de-interleaving, a single burst error (that would otherwise overwhelm the error correction) becomes a series of shorter errors that are spread out among a longer section of the data stream and are thus correctable—because each of the multiple smaller errors is individually within the correction capacity of the error correction.

However, interleaving introduces at least two costs: One is that de-interleaving consumes battery power in the UE, because it requires the UE to expend processing cycles beyond merely decoding symbols. Another is that it introduces communication delays, reducing spectral efficiency. When data is interleaved, symbols are spread out in time, each taking longer to transmit than if no interleaving had been used. Upon reception, decoding of a symbol is again delayed by the time required for de-interleaving.

SUMMARY

The following summary is provided to illustrate examples disclosed herein, but is not meant to limit all examples to any particular configuration or sequence of operations.

Solutions for dynamically toggling physical downlink control channel (PDCCH) interleaving include: interleaving, by a base station, data transmitted on a physical downlink control channel (PDCCH); receiving, by the base station, from a first user equipment (UE), a first plurality of radio measurement reports; based on at least the first plurality of radio measurement reports, determining, by the wireless network, that radio reception by the first UE meets a first threshold; based on at least determining that radio reception by the first UE meets the first threshold, instructing the first UE, by the base station, that PDCCH interleaving is ceasing; and transmitting, by the base station, data on the PDCCH without interleaving.

BRIEF DESCRIPTION OF THE DRAWINGS

The disclosed examples are described below with reference to the accompanying drawing figures listed below, wherein.

Figure 1:
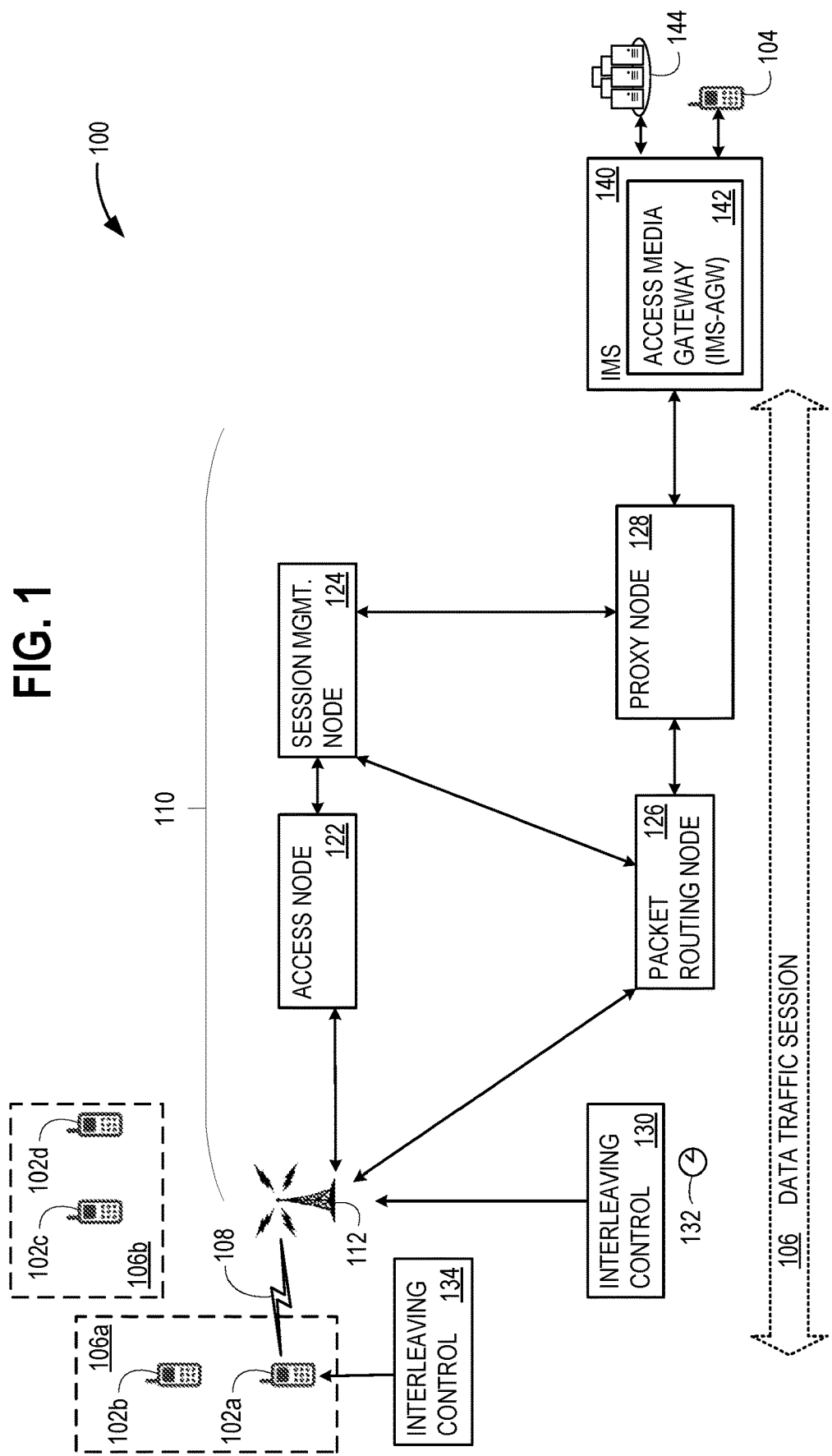
FIG. 1 illustrates an exemplary arrangement that advantageously dynamically toggles physical downlink control channel (PDCCH) interleaving.

Corresponding reference characters indicate corresponding parts throughout the drawings, where practical. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions for dynamically toggling physical downlink control channel (PDCCH) interleaving include: a base station receiving radio measurement reports from a user equipment (UE); based on at least the radio measurement reports, determining that radio reception by the UE meets a threshold; based on at least meeting the threshold, ceasing to interleave data on the PDCCH. The base station continues to monitor radio measurement reports from the UE, and based on at least the radio measurement reports indicating that radio reception by the UE meets a second threshold, resuming interleaving data transmitted on the PDCCH. In some examples, UEs are managed in broadcast groups (e.g., UEs within a common in a cell sector), and interleaving or ceasing interleaving is based on a determination of whether all UEs in the broadcast group are able to reliably decode the PDCCH without interleaving.

Aspects of the disclosure improve the efficiency of cellular communications by both extending battery life of UEs and reducing communication delays. This is accomplished by dynamically toggling PDCCH interleaving off when practical, which reduces the need for UEs to accomplish power-hungry computations and precludes de-interleaving delays, and toggling PDCCH interleaving back on when necessary for reliability of the channel. This reduces overhead for both the UE and the base station and improves spectral efficiency of the wireless network, when radio conditions permit. For example, specific actions taken in furtherance of this advantageous operation include based on at least determining that radio reception by a UE meets a threshold, instructing the UE, by a base station, that PDCCH interleaving will cease, and transmitting, by the base station, data on the PDCCH without interleaving.

With reference now to the figures, FIG. 1 illustrates an arrangement 100 that advantageously provides for dynamically toggling PDCCH interleaving. In arrangement 100, a wireless network 110 provides a data traffic session 106 for UE 102a, for example a voice call with another UE 104 or a data packet session with a packet data network 144. A base station 112 of wireless network 110 serves UE 102a and communicates with UE 102a using an air interface 108. Signaling for setting up data traffic session 106 passes from base station 112 through an access node 122 to a session management node 124. Data packets of data traffic session 106 pass from base station 112 through a packet routing node 126 and a proxy node 128 to an internet protocol (IP) multimedia system (IMS) 140, which has an IMA access media gateway (IMS-AGW) 142. Further networks connect IMS-AGW 142 to UE 104 and/or packet data network 144.

In some examples, wireless network 110 may comprise a fifth generation (5G) cellular network, or another wireless network. For a 5G wireless network 110, base station 112 may comprise a gNodeB (gNB), access node 122 may comprise an access and mobility management function (AMF), session management node 124 may comprise a session management function (SMF), and packet routing node 126 may comprise a user plane function (UPF). In some examples, proxy node 128 comprises a proxy-call session control function (P-CSCF).

5G cellular network employs control plane and user plane separation (CUPS), which separates wireless network 110 into a control plane and a user plane. The control plane includes at least access node 122 and session management node 124. The user plane includes at least packet routing node 126 and proxy node 128. Data packets for signaling and data session control are routed between base station 112 and session management node 124 through access node 122.

Access node 122 supports the termination of non-access stratum (NAS) signaling, is which is a functional layer in wireless telecom protocol stacks between core network equipment of wireless network 110 and UEs. NAS signaling is used to manage the establishment of communication sessions and for maintaining continuous communications with the user equipment as they move. Base station 112 selects access node 122 (from a plurality of access nodes in wireless network 110) for a particular UE, based on network slicing constraints and support requested by the UE. Network slicing partitions wireless network 110 into multiple virtual networks.

One function of access node 122 is to route control plane data packets between base station 112 and session management node 124. The network segment between base station 112 and access node 122 uses an N2 reference interface, and the network segment between access node 122 and session management node 124 uses an N11 reference interface.

Session management node 124 is responsible for interacting with the decoupled data plane, creating updating and removing protocol data unit (PDU) sessions and managing session context with packet routing node 126. The network segment between session management node 124 and packet routing node 126 uses an N4 reference interface.

Packet routing node 126 performs packet routing and forwarding, packet inspection, and quality of service (QoS) handling for user plane data packets. Packet routing node 126 handles external protocol data unit (PDU) sessions between wireless network 110 and external data networks (DNs), for example, the internet. One function of packet routing node 126 is to route user plane data packets between base station 112 and proxy node 128, under management by session management node 124. The network segment between base station 112 and packet routing node 126 uses an N3 reference interface, the network segment between packet routing node 126 and external data networks (DNs) uses an N6 reference interface, and the network segment between packet routing node 126 and proxy node 128 uses a Gm reference interface.

Proxy node 128 is the contact point between wireless network 110 and IMS 140 and functions as a proxy server for the UEs whose user plane data packets pass through base station 112 and packet routing node 126. Session initiation protocol (SIP) signaling traffic to and from a UE passes through proxy node 128. UEs discover proxy node 128 via a discovery process using a network function (NF) repository function (NRF) in wireless network 110. Proxy node 128 may be located within wireless network 110 or within IMS 140.

Multiple benefits arise from CUPS. One benefit is that session management node 124 may be located in a centralized location for ease of management, while packet routing node 126 is located elsewhere, based on latency and other performance issues for user plane data traffic between a UE and either an external DN or IMS 140. This is a key performance enhancement for highly mobile connected applications and geographically-dispersed examples of wireless network 110. Another benefit is that wireless network 110 may have the control plane capacity and user plane capacity scaled separately, based on actual and expected dominant traffic type.

Cellular networks may use orthogonal frequency-division multiple access (OFDMA), which uses a combination of orthogonal frequency-division multiplexing (OFDM) and time domain multiple access (TDMA). With TDMA, all of the UEs being served by a base station must limit their transmissions to allocated time slots. The information is provided in the PDCCH. In some examples, the PDCCH is a broadcast channel, because it is received and processed by multiple UEs. In the example illustrated in FIG. 1, base station 112 is serving four UEs, UE 102a, a UE 102b, a UE 102c, and a UE 102d.

Figure 2:
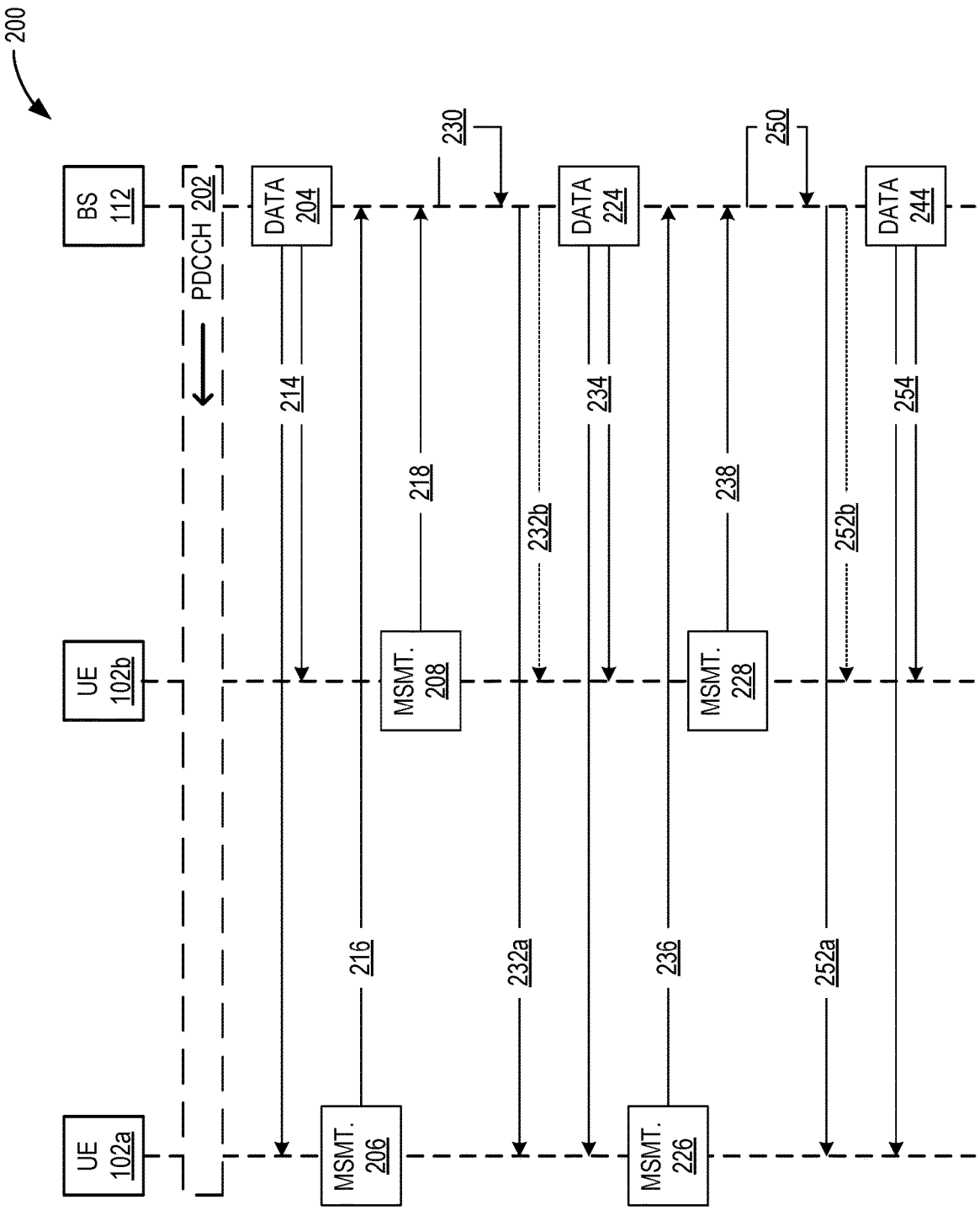
FIG. 2 illustrates a message sequence diagram of exemplary messages that may occur with examples of the arrangement of FIG. 1.

UE 102a and UE 102b are in a common sector for base station 112, and receive and use the same PDCCH broadcast on a common PDCCH 202 (shown in FIG. 2). Thus, UE 102a and UE 102b are within a PDCCH broadcast group 106a. UE 102c and UE 102d are in a common sector with each other, but different than for UE 102a and UE 102b, and so are within a different PDCCH broadcast group 106b. UE 102c and UE 102d may use a different PDCCH. In some examples, base station 112 toggles interleaving for PDCCH 202 independently from toggling interleaving for the PDCCH used by UE 102c and UE 102d.

Base station 112 has an interleaving control 130 that controls interleaving for PDCCH 202 and any other PDCCHs transmitted by base station 112, as described below. Base station 112 also has a timer 132 for use by interleaving control 130 in support of determining whether to toggle interleaving. UE 102a has an interleaving control 134 that toggles de interleaving of received PDCCH 202, as described below. UEs 102b-102d also have similar interleaving control functionality.

Third Generation Partnership Project (3GPP) technical standard TS 36.211, which has an equivalent European Telecommunications Standard Institute (ETSI) technical standard TS 136.211, sets forth 5G PDCCH formatting, for example in section 6.8. Section 6.8.5 ("Mapping to resource elements") specifies the interleaving algorithm for PDCCH in 5G. It should be understood, however, that examples of the disclosure may also be applicable to additional cellular generations and other networks.

FIG. 2 illustrates a message sequence diagram 200 of exemplary messages that may occur with examples of arrangement 100. Base station 112 uses PDCCH 202 for informing UE 102a and UE 102b of scheduling information and other control information, such as which radio resource elements to use. Data 204, which may be downlink control information (DCI), is transmitted with interleaving on PDCCH 202 as message 214, and received by UE 102a and UE 102b. Both UE 102a and UE 102b de-interleave message 214, and extract their relevant information. For example, interleaving control 134 de-interleaves data 204 for UE 102a. In some examples, message 214 may have some information that is relevant to both UE 102a and UE 102b, some that is relevant to only UE 102a, and also some that is relevant to only UE 102b.

UE 102*a* collects radio signal level measurements and transmits radio measurement reports 206, for example signal to interference and noise ratio (SINR), reference signal received power (RSRP), or reference signal received quality (RSRQ), to base station 112 as messages 216. In some examples, UE 102*a* collects radio signal level measurements and transmits radio measurement reports on a schedule, such as every 20 millisecond (ms). Thus, transmits radio measurement reports 206 represents a plurality of transmits radio measurement reports. In some examples, plurality of radio measurement reports 206 is made at or near the frequency band of PDCCH 202. For example, the measurements may be made of the received signal power of PDCCH 202.

Similarly, UE 102*b* collects equivalent radio signal level measurements and transmits a plurality of radio measurement reports 208 to base station 112 as messages 218. Base station 112 uses plurality of radio measurement reports 206 and 208 to determine whether to toggle interleaving of PDCCH 202 in toggling decision 230. In the illustrated example, toggling decision 230 results in base station 112 deciding to cease PDCCH interleaving. This may be the case, in some examples, when both UE 102*a* and UE 102*b* are receiving such strong radio signals for PDCCH 202 that interleaving is not required in order to maintain reliable decoding in the presence of interference and other noise. The decision process is performed by interleaving control 130, and is described in further detail in relation to FIGS. 3A-4.

Base station 112 instructs UE 102*a* and UE 102*b* that PDCCH interleaving is ceasing using at least a message 232*a* to UE 102*a*. In some examples, a combined message to all UEs receiving PDCCH broadcasts is used, rather than separate messages to individual UEs, although FIG. 2 illustrates using an optional separate message 232*b* to UE 102*b*. In some examples, PDCCH 202 is used for messages 232*a* and/or 232*b*, although in some examples, a different channel is used. Data 224 is then transmitted on PDCCH 202 as message 234 without interleaving. Interleaving control 134 ceases de-interleaving of data received on PDCCH 202.

UE 102*a* and UE 102*b* continue collecting radio signal level measurements and transmitting radio measurement reports to base station 112. For example, UE 102*a* transmits a plurality of radio measurement reports 226 as messages 236, and UE 102*b* transmits a plurality of radio measurement reports 228 as messages 238. Base station 112 uses plurality of radio measurement reports 226 and 228 to determine whether to toggle interleaving of PDCCH 202 in toggling decision 250. In the illustrated example, toggling decision 250 results in base station 112 deciding to resume PDCCH interleaving. This may be the case, in some examples, when either UE 102*a* or UE 102*b* is receiving such weak radio signals for PDCCH 202 that interleaving is likely required in order to maintain reliable decoding in the presence of interference and other noise. The decision process is performed by interleaving control 130, and is described in further detail in relation to FIGS. 3A-4.

Base station 112 instructs UE 102*a* and UE 102*b* that PDCCH interleaving is resuming using at least a message 252*a* to UE 102*a*. In some examples, a combined message to all UEs receiving PDCCH broadcasts is used, rather than separate messages to individual UEs, although FIG. 2 illustrates using an optional separate message 252*b* to UE 102*b*. In some examples, PDCCH 202 is used for messages 252*a* and/or 252*b*, although in some examples, a different channel is used. Data 244 is then transmitted on PDCCH 202 as message 254 with interleaving. Interleaving control 134 de-interleaves data 244 for UE 102*a*.

Figure 3A:
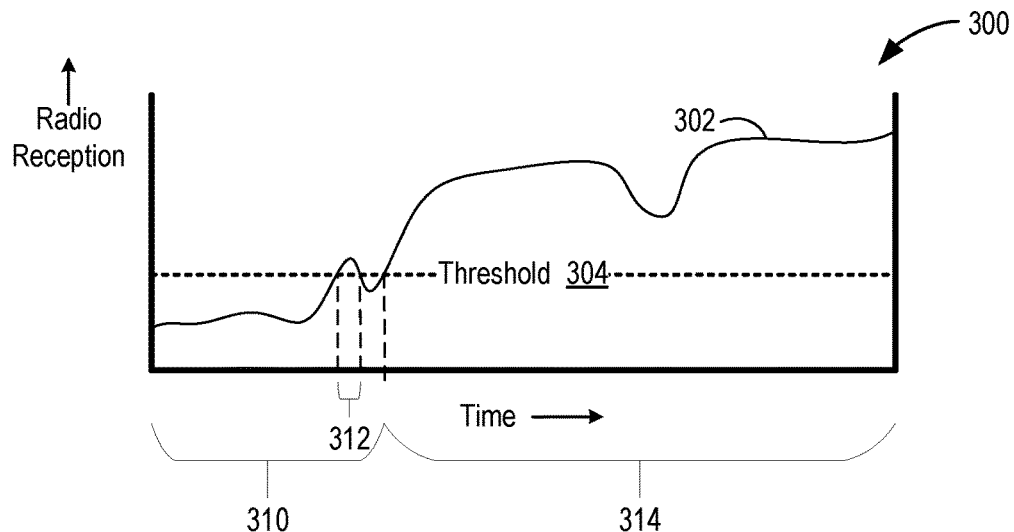
FIGS. 3A, 3B, and 3C illustrate various thresholds used by examples of the arrangement of FIG. 1.
Figure 3B:
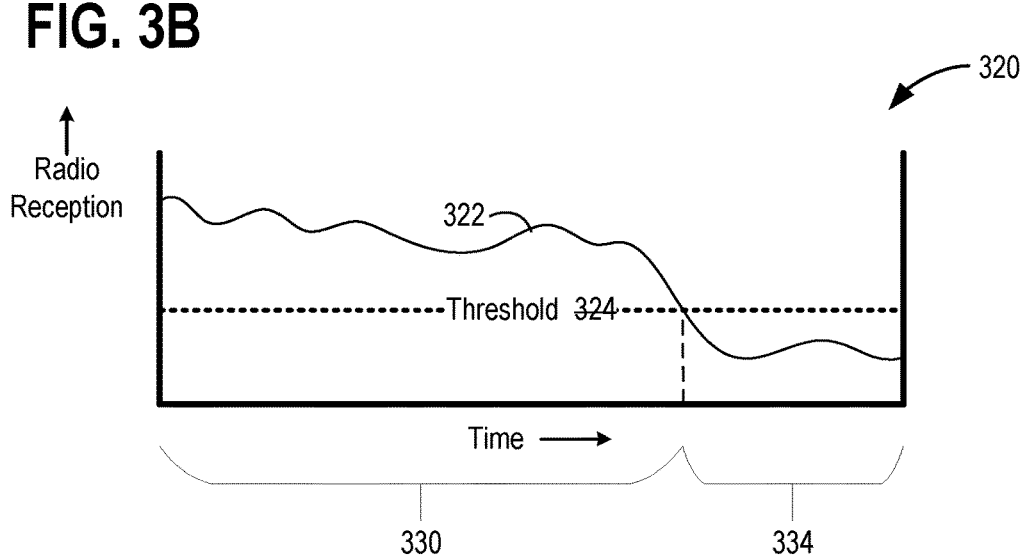
Figure 3C:
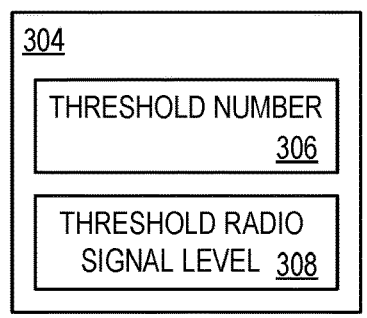
Figure 3C:
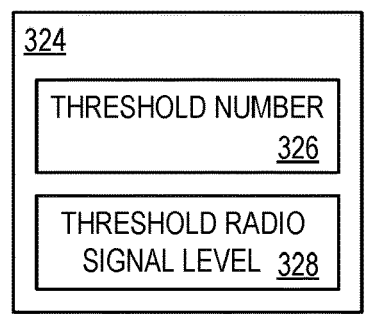

Examples of arrangement 100 use thresholds of the radio signal quality to determine whether to toggle PDCCH interleaving, and some example thresholds are illustrated in FIGS. 3A, 3B, and 3C. In FIG. 3A, a graph 300 plots a radio reception parameter 302 (e.g., radio signal power level, SINR, a compound parameter, or another) as a function of time, based at least partially on measurements reported by UE 102*a*. Radio reception parameter 302 is generally increasing with time, and crosses a threshold 304. This may occur, for example, if UE 102*a* is moving toward base station 112, and the propagation loss of PDCCH 202 drops as UE 102*a* nears base station 112 and the transmission path length shortens.

During a time period 310, radio reception parameter 302 is generally below threshold 304, and during a time period 314, radio reception parameter 302 is above threshold 304. Within time period 310, radio reception parameter 302 briefly rises above threshold 304 for a short time period 312, and then drops below threshold 304 again. If base station 112 toggles PDCCH interleaving immediately, without any delay, the PDCCH interleaving may toggle off and on in a rapid, ping-pong fashion. To prevent this, timer 132 (see FIG. 1) is used in some examples to introduce a delay prior to a toggle event.

In the scenario depicted in FIG. 3A, PDCCH 202 will be interleaved during time period 310, and for a short time into time period 314, and then PDCCH 202 will not be interleaved during the remainder of time period 314.

In FIG. 3B, a graph 320 plots a radio reception parameter 322 for UE 102*a*, which may be the same radio reception parameter 302, but at a different time. Radio reception parameter 322 is generally decreasing with time, and crosses a threshold 324. This may occur, for example, if UE 102*a* is moving away from base station 112, and the propagation loss of PDCCH 202 increases as the transmission path length increases. During a time period 330, radio reception parameter 322 is generally above threshold 324, and during a time period 334, radio reception parameter 322 is below threshold 324. Delays may be used for both toggle directions, on to off and off to on.

In the scenario depicted in FIG. 3B, PDCCH 202 will be not interleaved during time period 330, and for a short time into time period 334, and then PDCCH 202 will be interleaved during the remainder of time period 334.

In some examples, threshold 324 is lower than threshold 304, such that it takes a higher received signal power to trigger toggling interleaving from on to off than is required to trigger toggling interleaving from off to on. This introduces a hysteresis condition that reduces the likelihood of a ping-pong effect that might otherwise occur if the radio reception of UE 102*a* was rapidly oscillating above and below threshold 304. With the hysteresis condition, once interleaving has ceased, radio reception must degrade an appreciable amount before interleaving resumes.

FIG. 3C illustrates compound thresholds in which two conditions must be met for the threshold as a whole to be met. For example, threshold 304 is illustrated as a threshold number 306 of radio measurement reports that meet a threshold radio signal level 308, and threshold 324 is illustrated as a threshold number 326 of radio measurement reports that meet a threshold radio signal level 328. In some examples, threshold number 306 and threshold number 326 are the same, or nearly so, and threshold radio signal level 308 is at least at great as threshold radio signal level 328.

In some examples, threshold number 306 and/or 326 is 40 or 50, and may be set as a number (without reference to timer 132), or may be set based on a time interval (measured by timer 132) and the rate at which UE 102*a* transmits measurement reports (e.g., 1 second at 20 ms is 50 reports). In some examples, threshold number 306 is further determined using some minimum number of radio measurement reports assessed and a percentage of that minimum number of radio measurement reports exceeds threshold radio signal level 308. Some examples may require that all radio measurement reports within a time period exceed threshold radio signal level 308. One possible example for threshold number 306 may be 80% of measurements, over a full second, exceeding threshold radio signal level 308 is 0.8×1/0.02=40. Many other equivalents are possible.

In some examples, threshold radio signal level 308 is −100 decibel milliwatt (dBm), or −105 dBm, or some other value. In some examples, threshold radio signal level 328 is 1 dBm, 2 dBm, 3 dBM, 5 dBM, or some other amount below threshold radio signal level 308.

Figure 4:
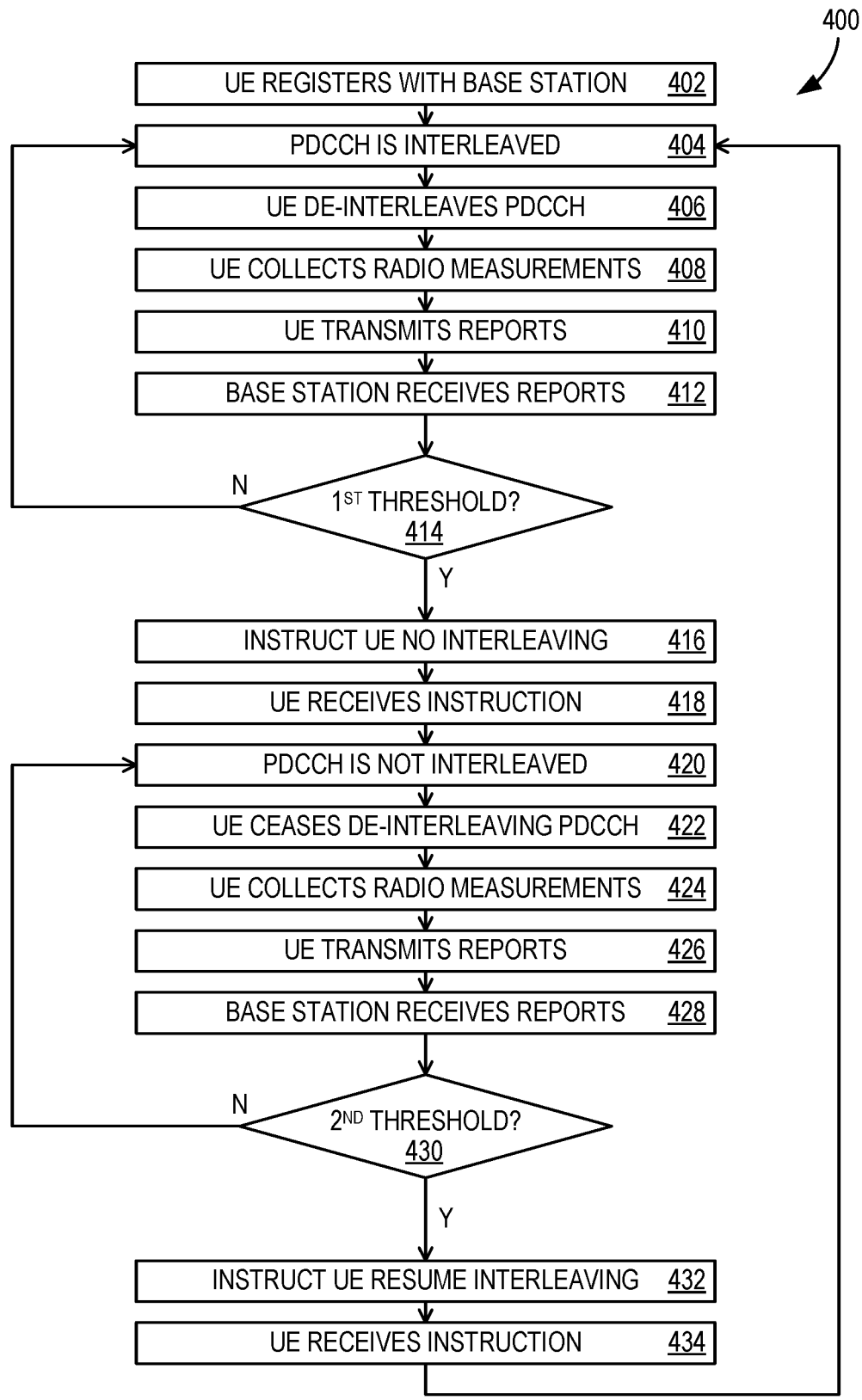
FIG. 4 illustrates a flowchart of exemplary operations associated with examples of the arrangement of FIG. 1.

FIG. 4 illustrates a flowchart 400 of exemplary operations associated with arrangement 100 providing data traffic session 106 for UE 102*a*. In some examples, at least a portion of flowchart 400 may be performed using one or more computing devices 600 of FIG. 6 (e.g., base station 112, access node 122, session management node 124, packet routing node 126, and proxy node 128 may use examples of computing device 600). In some examples, wireless network 110 comprises a 5G wireless network. In some examples, data traffic session 106 comprises a voice session or a packet data session (other than a voice session).

Flowchart 400 commences with UE 102 registering with base station 112 in operation 402, so that base station 112 is a serving base station of UE 102*a*. In some examples, base station 112 comprises a gNB and/or interleaves PDCCH 202 by default. Operation 404 includes base station 112 interleaving data (e.g., data 204) transmitted on PDCCH 202. In operation 406, UE 102*a* and UE 102*b* receive and de-interleave data received on PDCCH 202. In the scenario illustrated in FIG. 1, UE 102*a* and UE 102*b* are within PDCCH broadcast group 106*a*. Additional UEs served by base station 112, such as UE 102*c* and UE 102*d*, are within a separate PDCCH broadcast group 106*b*.

In operation 408, UE 102*a* collects radio measurements and transmits plurality of radio measurement reports 206 to base station 112 in operation 410. In some examples, each measurement report includes at least one signal parameter selected from the list consisting of: SINR, RSRP, and RSRQ. In some examples, UE 102*a* transmits measurement reports on a schedule, such as a 20 ms or greater interval. Base station 112 receives plurality of radio measurement reports 206 from UE 102*a* in operation 412.

In decision operation 414, wireless network 110 (possibly using interleaving control 130 at base station 112) determines whether radio reception by UE 102*a* meets threshold 304, based on at least plurality of radio measurement reports 206. This is used to determine whether to cease or resume PDCCH interleaving. In some examples, determining whether to cease or resume PDCCH interleaving is done independently for each PDCCH broadcast group. This means decision operation 414 is performed separately for PDCCH broadcast groups 106*a* and 106*b*. In some examples, threshold 304 comprises a compound threshold comprising threshold number 306 of radio measurement reports indicating that UE 102*a* receives radio signals from base station 112 meeting or exceeding threshold radio signal level 308.

In some examples, plurality of radio measurement reports 206 comprises a minimum number of radio measurement reports. In some examples, threshold number 306 is less than or equal to the minimum number of radio measurement reports. In some examples, threshold number 306 is determined, at least in part, by timer 132 and a rate at which UE 102*a* transmits measurement reports. In some examples, threshold number 306 is set without reference to a timer. In some examples, threshold number 306 is determined, at least in part, by a percentage of the minimum number of radio measurement reports. In some examples, threshold number 306 of radio measurement reports is at least 40. In some examples, threshold radio signal level 308 is based on at least a frequency band of PDCCH 202. In some examples, threshold radio signal level 308 is −100 dBm or −105 dBm.

If radio reception by UE 102*a* does not meet threshold 304 (i.e., radio reception is not sufficiently good that PDCCH interleaving may be suspended), flowchart 400 returns to operation 404. Otherwise, if radio reception by UE 102*a* is sufficiently good that PDCCH interleaving may be suspended, wireless network 110 determines, in decision operation 414, based on at least plurality of radio measurement reports 206, that radio reception by UE 102*a* meets threshold 304. In some examples, determining to cease PDCCH interleaving comprises determining that both radio reception by UE 102*a* meets threshold 304, and also that radio reception by UE 102*b* meets threshold 304.

Operation 416 includes, based on at least determining that radio reception by UE 102*a* meets threshold 304, instructing UE 102*a*, by base station 112, that PDCCH interleaving is ceasing. UE 102*a* receives the instruction as message 232*a*, from base station 112, in operation 418. In operation 420, base station 112 transmits data (e.g., data 224) on PDCCH 202 without interleaving. Based on at least receiving message 232*a*, UE 102*a* ceases de-interleaving of data received on PDCCH 202 in operation 422.

In operation 424, UE 102*a* collects radio measurements and transmits plurality of radio measurement reports 226 to base station 112 in operation 426. Base station 112 receives plurality of radio measurement reports 226 from UE 102*a* in operation 428.

In decision operation 430, wireless network 110 determines whether radio reception by UE 102*a* meets threshold 324, based on at least plurality of radio measurement reports 226. This is used to determine whether to resume PDCCH interleaving. In some examples, decision operation 430 is performed independently for each PDCCH broadcast group. In some examples, threshold 324 comprises a compound threshold comprising threshold number 326 of radio measurement reports indicating that UE 102*a* receives radio signals from base station 112 failing to meet threshold radio signal level 328. Meeting threshold 324 is defined here to mean poor performance, such that the measured radio parameter is below a reference value (e.g., threshold radio signal level 328).

In some examples, threshold radio signal level 328 is lower than threshold radio signal level 308, for example by at least 1 dBm, although in some examples, it may be the same. In some examples, threshold radio signal level 328 is based on at least a frequency band of PDCCH 202. In some examples, threshold number 326 is the same as threshold number 306, although these numbers may differ in some examples.

If radio reception by UE 102*a* does not meet threshold 324 (i.e., radio reception is sufficiently good that PDCCH interleaving may remain suspended), flowchart 400 returns to operation 420. Otherwise, if radio reception by UE 102*a* is sufficiently poor that PDCCH interleaving should resume, wireless network 110 determines, in decision operation 430, based on at least plurality of radio measurement reports 226, that radio reception by UE 102a meets threshold 324. In some examples, determining to resume PDCCH interleaving comprises determining that either radio reception by UE 102a meets threshold 324, or else that radio reception by UE 102b meets threshold 324.

Operation 432 includes, based on at least determining that radio reception by UE 102a meets threshold 324, instructing UE 102a, by base station 112, that PDCCH interleaving is resuming. UE 102a receives the instruction as message 252a, from base station 112, in operation 434. Flowchart 400 then returns to operation 404. In this next pass-through operation 404, base station 112 transmits data (e.g., data 244) on PDCCH 202 with interleaving. And also, in this next pass-through flowchart 400, operation 404 comprises, based on at least receiving the second message, de-interleaving data received on PDCCH 202 by UE 102a.

Figure 5:
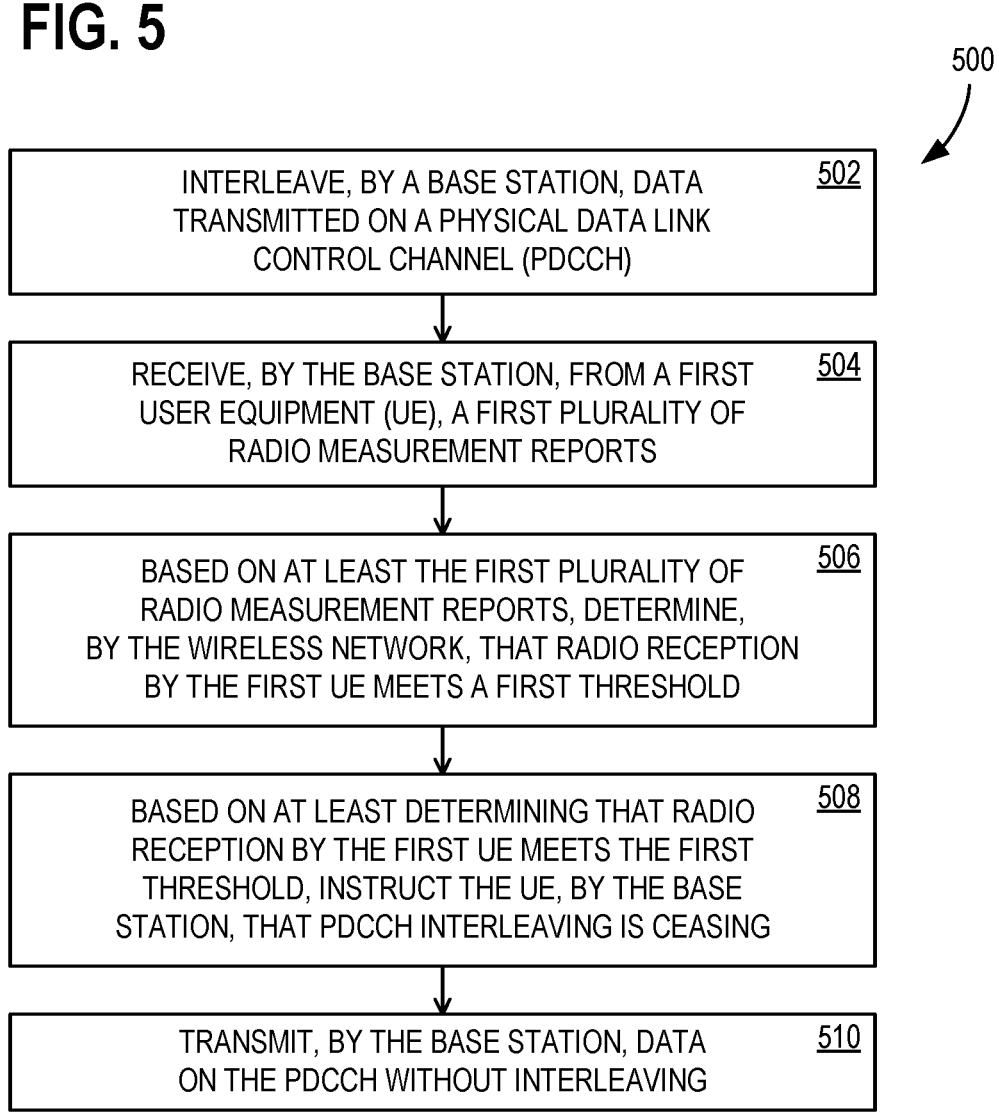
FIG. 5 illustrates another flowchart of exemplary operations associated with examples of the arrangement of FIG. 1.

FIG. 5 illustrates a flowchart 500 of exemplary operations associated with examples of arrangement 100. In some examples, at least a portion of flowchart 500 may be performed using one or more computing devices 600 of FIG. 6. Flowchart 500 commences with operation 502, which includes interleaving, by a base station, data transmitted on a PDCCH.

Operation 504 includes receiving, by the base station, from a first UE, a first plurality of radio measurement reports. Operation 506 includes, based on at least the first plurality of radio measurement reports, determining, by the wireless network, that radio reception by the first UE meets a first threshold. Operation 508 includes, based on at least determining that radio reception by the first UE meets the first threshold, instructing the first UE, by the base station, that PDCCH interleaving is ceasing. Operation 510 includes transmitting, by the base station, data on the PDCCH without interleaving.

Figure 6:
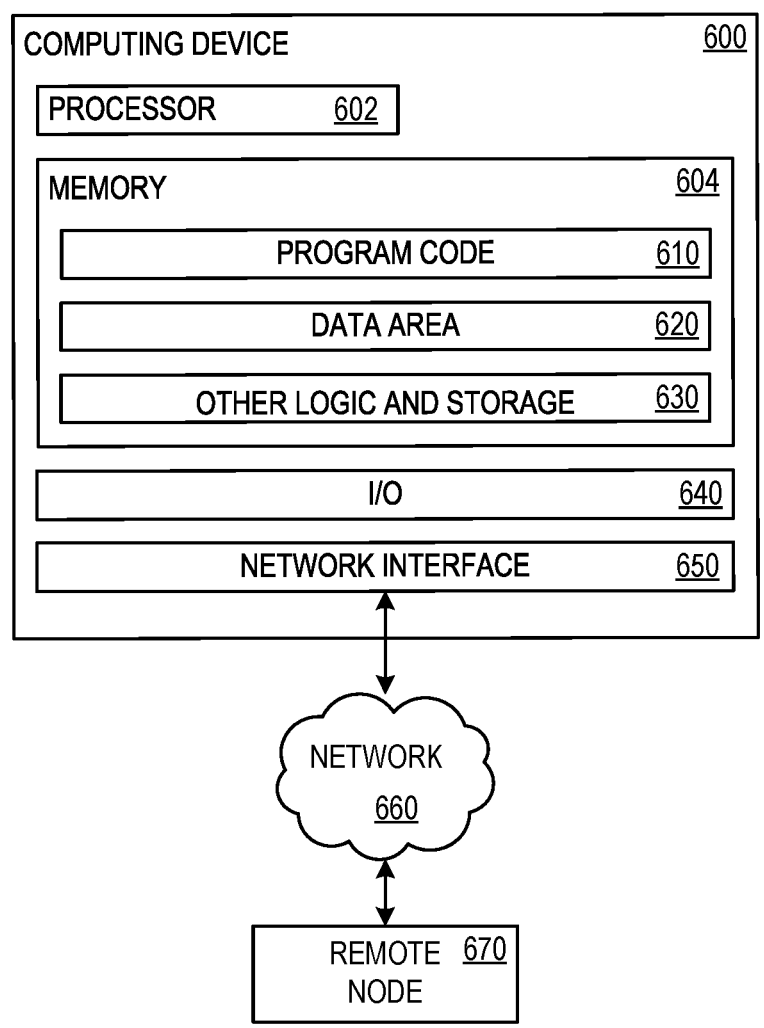
FIG. 6 illustrates a block diagram of a computing device suitable for implementing various aspects of the disclosure.

FIG. 6 illustrates a block diagram of computing device 600 that may be used as any component described herein that may require computational or storage capacity. Computing device 600 has at least a processor 602 and a memory 604 that holds program code 610, data area 620, and other logic and storage 630. Memory 604 is any device allowing information, such as computer executable instructions and/or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including any instructions necessary to perform operations described herein. Data area 620 holds any data necessary to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over a network 660 with a remote node 670, which may represent another implementation of computing device 600. For example, a remote node 670 may represent another of the above-noted nodes within arrangement 100.

Additional Examples

An example method of providing a data traffic session over a wireless network comprises: interleaving, by a base station, data transmitted on a PDCCH; receiving, by the base station, from a first UE, a first plurality of radio measurement reports; based on at least the first plurality of radio measurement reports, determining, by the wireless network, that radio reception by the first UE meets a first threshold; based on at least determining that radio reception by the first UE meets the first threshold, instructing the first UE, by the base station, that PDCCH interleaving is ceasing; and transmitting, by the base station, data on the PDCCH without interleaving.

An example system for providing a data traffic session over a wireless network comprises: a processor; and a computer-readable medium storing instructions that are operative upon execution by the processor to: interleave, by a base station, data transmitted on a PDCCH; receive, by the base station, from a first UE, a first plurality of radio measurement reports; based on at least the first plurality of radio measurement reports, determine, by the wireless network, that radio reception by the first UE meets a first threshold; based on at least determining that radio reception by the first UE meets the first threshold, instruct the first UE, by the base station, that PDCCH interleaving is ceasing; and transmit, by the base station, data on the PDCCH without interleaving.

One or more example computer storage devices has computer-executable instructions stored thereon, which, upon execution by a computer, cause the computer to perform operations comprising: interleaving, by a base station, data transmitted on a PDCCH; receiving, by the base station, from a first UE, a first plurality of radio measurement reports; based on at least the first plurality of radio measurement reports, determining, by the wireless network, that radio reception by the first UE meets a first threshold; based on at least determining that radio reception by the first UE meets the first threshold, instructing the first UE, by the base station, that PDCCH interleaving is ceasing; and transmitting, by the base station, data on the PDCCH without interleaving.

Alternatively, or in addition to the other examples described herein, examples include any combination of the following:

receiving, by the base station, from the first UE, a second plurality of radio measurement reports;
  based on at least the second plurality of radio measurement reports, determining, by the wireless network, that radio reception by the first UE meets a second threshold;
  based on at least determining that radio reception by the first UE meets the second threshold, instructing the first UE, by the base station, that PDCCH interleaving is resuming;
  interleaving, by the base station, data transmitted on the PDCCH;
  the first UE and the second UE are within a first PDCCH broadcast group;
  additional UEs served by the base station are within a separate PDCCH broadcast group;
  determining, by the wireless network, whether to cease or resume PDCCH interleaving independently for each PDCCH broadcast group;
  determining to cease PDCCH interleaving comprises determining that both radio reception by the first UE meets the first threshold, and radio reception by the second UE meets the first threshold;
  determining to resume PDCCH interleaving comprises determining that either radio reception by the first UE meets the second threshold, or radio reception by the second UE meets the second threshold;

the first threshold comprises a compound threshold comprising a first threshold number of the radio measurement reports indicating that the first UE receives radio signals from the base station meeting or exceeding a first threshold radio signal level;
the second threshold comprises a compound threshold comprising a second threshold number of the radio measurement reports indicating that the first UE receives radio signals from the base station failing to meet a second threshold radio signal level;
the second threshold radio signal level is lower than the first threshold radio signal level;
the first plurality of radio measurement reports comprises a minimum number of radio measurement reports;
the first threshold number of the radio measurement reports is less than or equal to the minimum number of radio measurement reports;
the first threshold radio signal level is based on at least a frequency band of the PDCCH;
receiving, by the first UE, from the base station, a first message indicating that PDCCH interleaving is ceasing;
based on at least receiving the first message, ceasing de-interleaving of data received on the PDCCH;
receiving, by the first UE, from the base station, a second message indicating that PDCCH interleaving is resuming;
based on at least receiving the second message, de-interleaving data received on the PDCCH;
each measurement report includes at least one signal parameter selected from the list consisting of: SINR, RSRP, and RSRQ;
the data traffic session comprises a voice session;
the data traffic session comprises a packet data session;
the wireless network comprises a 5G wireless network;
the base station comprises a gNB
the base station comprises a serving base station of the first UE;
the base station interleaves the PDCCH by default;
registering, by the first UE, with the base station;
the first UE transmits measurement reports on a schedule;
the first UE transmits measurement reports on a 20 ms or greater interval;
the first threshold number of the radio measurement reports is determined, at least in part, by a timer and a rate at which the first UE transmits measurement reports;
the first threshold number of the radio measurement reports is determined, at least in part, by a percentage of the minimum number of radio measurement reports;
the first threshold number of the radio measurement reports is set without reference to a timer;
the first threshold number of the radio measurement reports is at least 40;
first threshold radio signal level is −100 dBm;
first threshold radio signal level is −105 dBm;
the first threshold radio signal level is based on at least a frequency band of the PDCCH;
the second threshold number of the radio measurement reports is the same as the first threshold number of the radio measurement reports;
the second plurality of radio measurement reports comprises a second minimum number of radio measurement reports;
the second threshold radio signal level is the same as or lower than the first threshold radio signal level;
the second threshold radio signal level is at least 1 dbm lower than the first threshold radio signal level; and
the second threshold radio signal level is based on at least a frequency band of the PDCCH.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing a data traffic session over a wireless network, the method comprising:
   transmitting, by a base station, interleaved data over a physical downlink control channel (PDCCH);
   receiving, by the base station, a first plurality of radio measurement reports from a first user equipment (UE);
   based on at least the first plurality of radio measurement reports, determining, by the wireless network, that radio reception by the first UE meets a first threshold;
   based on at least determining that radio reception by the first UE meets the first threshold, transmitting, by the base station, an indication that PDCCH interleaving is ceasing to the first UE;
   transmitting, by the base station, data over the PDCCH without interleaving;
   receiving, by the base station, a second plurality of radio measurement reports from the first UE;
   based on at least the second plurality of radio measurement reports, determining that radio reception by the first UE meets a second threshold;
   based on at least determining that radio reception by the first UE meets the second threshold, transmitting, by the base station, an indication that PDCCH interleaving is resuming to the first UE; and
   transmitting, by the base station, additional interleaved data over the PDCCH.

2. The method of claim 1, wherein the first UE and a second UE are within a first PDCCH broadcast group, and wherein additional UEs served by the base station are within a separate PDCCH broadcast group, and wherein the method further comprises:
   determining, by the wireless network, whether to cease or resume PDCCH interleaving independently for each PDCCH broadcast group;

wherein determining to cease PDCCH interleaving comprises determining that both:
  radio reception by the first UE meets the first threshold, and
  radio reception by the second UE meets the first threshold; and
wherein determining to resume PDCCH interleaving comprises determining that either:
  radio reception by the first UE meets the second threshold, or
  radio reception by the second UE meets the second threshold.

3. The method of claim 1,
wherein the first threshold comprises a compound threshold comprising a first threshold number of the radio measurement reports indicating that the first UE receives radio signals from the base station meeting or exceeding a first threshold radio signal level;
wherein the second threshold comprises a compound threshold comprising a second threshold number of the radio measurement reports indicating that the first UE receives radio signals from the base station failing to meet a second threshold radio signal level; and
wherein the second threshold radio signal level is lower than the first threshold radio signal level.

4. The method of claim 3,
wherein the first plurality of radio measurement reports comprises a minimum number of radio measurement reports;
wherein the first threshold number of the radio measurement reports is less than or equal to the minimum number of radio measurement reports; and
wherein the first threshold radio signal level is based on at least a frequency band of the PDCCH.

5. The method of claim 1, wherein the second plurality of radio measurement reports include signal to interference and noise ratios (SINRs).

6. The method of claim 1, wherein the second plurality of radio measurement reports include reference signal received power (RSRP) levels.

7. The method of claim 1, wherein the second plurality of radio measurement reports include reference signal received quality (RSRQ) levels.

8. A method of providing a data traffic session over a wireless network, the method comprising:
  transmitting, by a base station, interleaved data over a physical downlink control channel (PDCCH);
  receiving, by the base station, initial radio measurement report(s) from a user equipment (UE);
  transmitting, by the base station, an indication that PDCCH interleaving is ceasing to the UE responsive to receiving the initial radio measurement report(s);
  receiving, by the base station, subsequent radio measurement report(s) from the UE;
  transmitting, by the base station, an indication that PDCCH interleaving is resuming to the UE responsive to receiving the subsequent radio measurement report(s); and
  transmitting, by the base station, additional interleaved data over the PDCCH after transmitting the indication that PDCCH interleaving is resuming.

9. The method of claim 8, wherein the subsequent radio measurement report(s) include signal to interference and noise ratios (SINRs).

10. The method of claim 8, wherein the subsequent radio measurement report(s) include reference signal received power (RSRP) levels.

11. The method of claim 8, wherein the subsequent radio measurement report(s) include reference signal received quality (RSRQ) levels.

12. A method of providing a data traffic session over a wireless network, the method comprising:
  transmitting, by a base station, interleaved data over a physical downlink control channel (PDCCH) to user equipments (UEs) in a first PDCCH broadcast group;
  receiving, by the base station, initial radio measurement report(s) from the UEs in the first PDCCH broadcast group;
  transmitting, by the base station, indication(s) that PDCCH interleaving is ceasing to the first PDCCH broadcast group responsive to receiving the initial radio measurement report(s);
  receiving, by the base station, subsequent radio measurement report(s) from the UEs in the first PDCCH broadcast group;
  transmitting, by the base station, indication(s) that PDCCH interleaving is resuming to the first PDCCH broadcast group responsive to receiving the subsequent radio measurement report(s); and
  transmitting, by the base station, additional interleaved data over the PDCCH to the first PDCCH broadcast group after transmitting the indication(s) that PDCCH interleaving is resuming to the first PDCCH broadcast group.

13. The method of claim 12, wherein the base station determines whether to cease or resume PDCCH interleaving to the first PDCCH broadcast group independently from determining whether to cease or resume PDCCH interleaving to a second PDCCH broadcast group.

14. The method of claim 13, wherein the base station determines to cease PDCCH interleaving to the first PDCCH broadcast group based on a threshold number of the initial radio measurement report(s) meeting a first threshold radio signal level.

15. The method of claim 14, wherein the first threshold radio signal level is based on at least a frequency band of the PDCCH.

16. The method of claim 14, wherein the base station determines to resume PDCCH interleaving to the first PDCCH broadcast group based on a threshold number of the subsequent radio measurement report(s) failing to satisfy a second threshold radio signal level, the second threshold radio signal level being lower than the first threshold radio signal level.

17. The method of claim 12, wherein the subsequent radio measurement report(s) include signal to interference and noise ratios (SINRs).

18. The method of claim 12, wherein the subsequent radio measurement report(s) include reference signal received power (RSRP) levels.

19. The method of claim 12, wherein the subsequent radio measurement report(s) include reference signal received quality (RSRQ) levels.

* * * * *